United States Patent
Nakagawa et al.

[11] Patent Number: 6,005,967
[45] Date of Patent: *Dec. 21, 1999

[54] PICTURE SYNTHESIZING APPARATUS AND METHOD

[75] Inventors: Masamichi Nakagawa, Hirakata; Junichi Sato, Nara; Yoshiyasu Kado, Matsudo, all of Japan

[73] Assignee: Matushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,266

[22] Filed: Oct. 30, 1996

Related U.S. Application Data

[63] Continuation of application No. 08/391,607, Feb. 21, 1995, abandoned.

[30] Foreign Application Priority Data

Feb. 18, 1994 [JP] Japan ................................ 6-021038

[51] Int. Cl.⁶ .............................. G06K 9/00; G03B 21/60
[52] U.S. Cl. ........................ 382/154; 40/411; 359/458; 382/291; 463/32; 345/422
[58] Field of Search ................................ 382/107, 154, 382/291; 348/154, 155; 395/130, 125, 126, 127; 364/578; 359/458; 40/411; 463/32; 345/421, 422

[56] References Cited

U.S. PATENT DOCUMENTS

| | | | |
|---|---|---|---|
| 4,172,632 | 10/1979 | Holmes, Jr. | 359/465 |
| 4,267,562 | 5/1981 | Raimondi | 348/144 |
| 4,645,459 | 2/1987 | Graf et al. | 434/43 |
| 4,731,864 | 3/1988 | Modla | 382/255 |
| 4,835,537 | 5/1989 | Manion | 342/30 |
| 4,951,229 | 8/1990 | DiNicola et al. | 364/521 |
| 4,992,780 | 2/1991 | Penna et al. | 340/729 |
| 5,016,173 | 5/1991 | Kenet et al. | 382/128 |
| 5,023,800 | 6/1991 | Carver et al. | 364/474.24 |
| 5,027,413 | 6/1991 | Barnard | 382/103 |
| 5,034,987 | 7/1991 | Fujimoto et al. | 382/154 |
| 5,255,211 | 10/1993 | Redmond | 364/578 |
| 5,355,442 | 10/1994 | Paglieroni et al. | 395/127 |
| 5,415,548 | 5/1995 | Adams | 364/578 |
| 5,513,130 | 4/1996 | Redmond | 364/578 |
| 5,613,048 | 3/1997 | Chen et al. | 395/119 |

FOREIGN PATENT DOCUMENTS

| | | |
|---|---|---|
| 0 100 097 | 2/1984 | European Pat. Off. . |
| 2 256 567 | 12/1992 | United Kingdom . |

OTHER PUBLICATIONS

EPO Search Report dated Dec. 15, 1995.

*Primary Examiner*—Jon Chang
*Assistant Examiner*—Jayanti K. Patel
*Attorney, Agent, or Firm*—Ratner & Prestia

[57] ABSTRACT

The invention relates to a picture synthesizing apparatus for cutting out the background from a picture depending on the move of the viewing point, and presents a picture synthesizing apparatus capable of synthesizing a picture by hidden surface processing, processing of reflection motion by contact, or the like, which is mutual interference of background and foreground, wherein a background picture corresponding to the viewing field is cut out by a background cut-out unit from a background picture in a wide range stored in a background picture store, the shape and position information of moving object of foreground is generated in a moving foreground object generating unit, the interference of depth information corresponding to background picture from a background depth store and foreground object information is calculated in a background and foreground synthesizing unit, and a picture is synthesized by hidden surface processing or processing of change of moving direction of foreground object by reflection, so that the picture can be synthesized not as a shape such as column and plane, but in consideration of a picture hiding the foreground by the background, pass-through, and reflection of foreground object colliding against the background by making use of its undulation information.

24 Claims, 11 Drawing Sheets

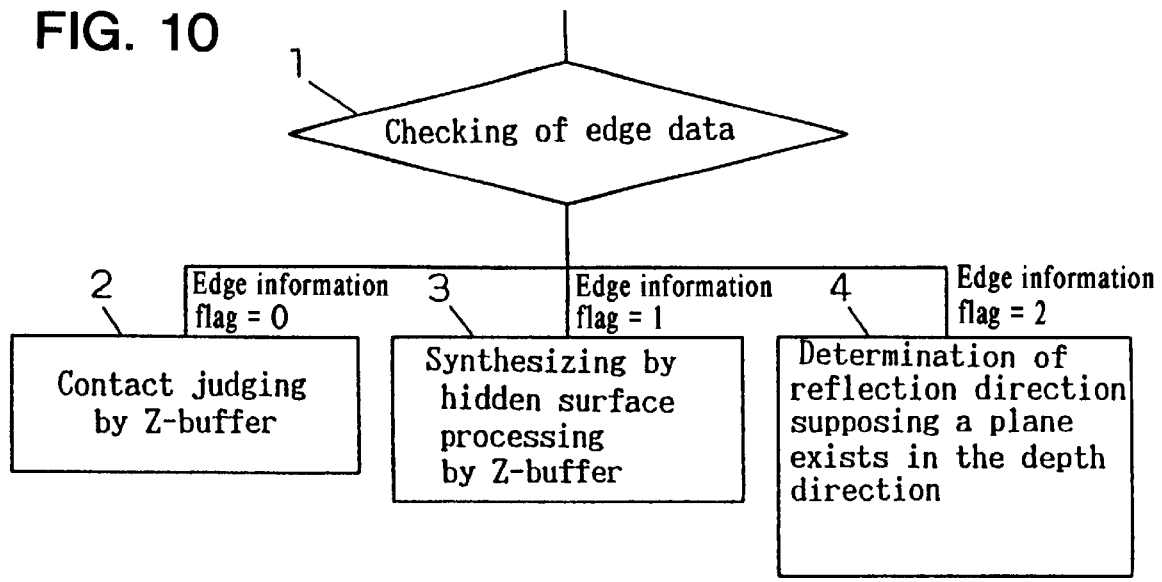
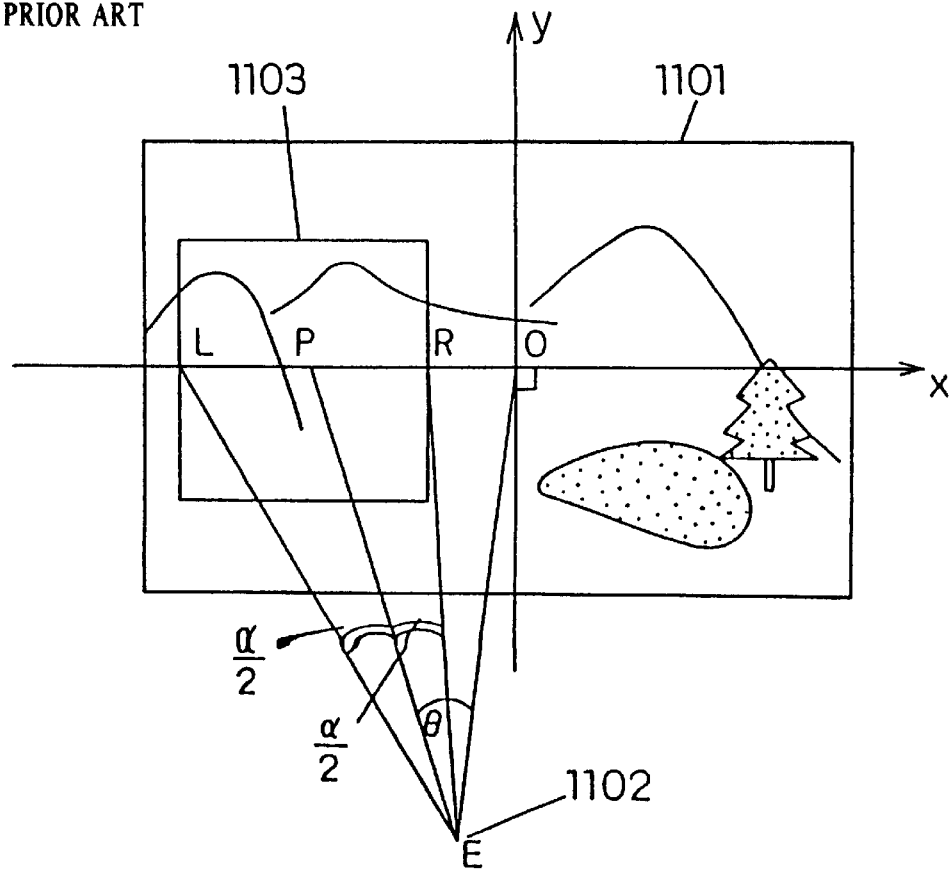

PICTURE SYNTHESIZING APPARATUS AND METHOD

This application is a continuation of application Ser. No. 08/391,607 filed Feb. 21, 1995, now abandoned.

BACKGROUND OF THE INVENTION

1. Industrial Field of Utilization

The present invention relates to a picture synthesizing apparatus and method.

2. Related Art of the Invention

To present a picture with a presence so that the viewer feels as if seeing the actual scene, it is important to present the image corresponding to the changes of viewing point so that the surrounding scene may be looked around when the viewer turns the head.

When a picture is synthesized from a three-dimensional model of an object or a reflection model of a surface hitherto used in computer graphics or the like, it is possible to synthesize the picture from an arbitrary viewpoint.

It is, however, often impossible to synthesize a picture of high quality in real time, depending on the instruction of move of viewing point of the viewer, due to limitation of the performance of the apparatus and the like.

Another problem is that the generated picture by computer graphics CG is an artificial and unnatural picture quality as compared with the natural picture taken by a camera or the like.

To solve these problems, it has been attempted to take in and utilize a CG picture preliminarily prepared by taking a processing time or a natural picture taken by a camera, in a synthesized picture.

Conventionally, such known arts included image synthesizing apparatuses for cutting out a picture depending on the direction of viewing point and angle of field of view indicated by the viewer, from a wide-angle plane picture taken by a wide-angle lens, or a columnar projected picture taken by rotating 360 degrees in the horizontal direction around one viewing point known as a panoramic picture.

These arts are described below. FIG. 11 is a diagram showing a method of cutting out a synthesized picture from a wide-angle plane picture. In the diagram, reference numeral 1101 denotes a plane picture taken by a wide-angle lens or the like, and the X-axis is defined in the horizontal direction with o at the center, and the Y-axis, in the vertical direction. Suppose to cut out a picture when rotated by θ degrees in the horizontal direction from the viewing point 1102. In this case, the center of a cut-out region 1103 is supposed to be P, and the right end and left end of the X-axis to be R and L, respectively. The X-coordinates of points R and L, Rx and Lx, are determined in the following formulas, supposing the angle of field of view in the horizontal direction to be degrees, and the distance from viewing point 1102 to the center o of the plane picture, that is, the focal length in taking picture to be F.

$$Rx = F \cdot \tan(\theta - /2)$$
$$Lx = F \cdot \tan(\theta + /2) \quad [1]$$

where the angle of rotation is positive in the left-thread direction about the Y-axis.

Similarly, the Y-coordinates of the upper end and lower end of the cut-out coordinates in the vertical direction, Uy, By, are calculated in the following formula, supposing the vertical field angle to be β.

$$Ux = F \cdot \tan(-\beta/2)$$
$$Bx = F \cdot \tan(\beta/2) \quad [2]$$

Hence, by cutting out the region designated by Rx, Lx, Uy, By, depending on the angle of rotation θ, a picture corresponding to the horizontal rotation of the viewing point can be synthesized.

Next is described a method of obtaining a synthesized picture in a certain viewing line direction from a panoramic picture. FIG. 12a is a schematic diagram showing the relation between a panoramic picture seen from above and a synthesized picture. Reference numeral 1201 is a panoramic picture projecting an image of 360 degrees in the horizontal direction on a circular cylinder. Various methods are known to create a panoramic picture, including a method of taking while rotating the photo detector of a vertical slit by 360 degrees, and a montage method of splicing plane pictures taken by rotating the camera or the like around the receiving plane by specific angles by deforming geometrically. The panoramic picture 1201 is a two-dimensional picture with angle of rotation of θ about the viewing point and height of h in the vertical direction. FIG. 12b is a plane development of this panoramic picture.

In FIG. 12a, the picture of observing the θ0 direction from the viewing point 1202 is a picture 1203 projecting the panoramic picture on a tangential plane of a circular cylinder.

Supposing the horizontal and vertical axes of a synthesized picture to be U, V and the focal length to be F, the point (θ1, h1) of panoramic picture corresponding to point (u1, v1) in the synthesized picture is determined in the following formula.

$$\theta 1 = \arctan(u1/F) + \theta 0$$
$$h1 = v1 \cdot \cos(\theta) \quad [3]$$

Supposing the angle of field of view to be a, a desired synthesized picture is obtained by calculating about u1 corresponding from θ0− /2 to θ0+ /2.

FIG. 12c shows an example of a picture. Reference numeral 1204 in FIG. 12b is a region in a panoramic picture corresponding to the cut-out picture of FIG. 12c.

In such picture synthesizing apparatus, however, since all pictures are present on the same plane and circular cylinder, processing using the information of undulations on the picture is impossible.

That is, in the picture synthesizing apparatus, when a background picture is handled, a sufficiently remote far-shot picture can be synthesized, but a picture mutually interfering with the foreground cannot be synthesized.

For example, as the foreground other than the background, when an object by computer graphics or the like is synthesized simultaneously, there is no undulation information in the background picture, it is impossible to process so as to synthesize to hide part of the foreground object by part of the background, or to vary the mode of collision depending on the shape of the background when the foreground object moves to collide against the background.

When handling the background of a short distance to the viewing point such as a room or a corner of street, mutual interference of background and foreground is effective to enhance the presence of the synthesizing effect.

SUMMARY OF THE INVENTION

It is hence a primary object of the invention to eliminate the problems and present a picture synthesizing apparatus capable of synthesizing, for example, reproduction in a reflection direction when a foreground object is hidden or an object collides against the background, by part of the background picture, due to undulations of a background picture.

To solve the problems, the invention comprises means for storing a background picture, means for storing the information of depth, slope and possibility of edge pass-through as undulation information of background picture, and control means for controlling the display or moving direction of foreground object by means for calculating the interference between the foreground object and undulation information of background picture.

According to the invention, since the undulation information of background picture is used, it is possible to synthesize not only plane or circular cylinder shapes, but also pictures having effects of hidden surface processing of background and foreground as the processing requiring complicated shape of background, or reflection depending on the inclination of undulations of the background object by collision of a foreground object against the background picture.

As for rotation of viewing point, on the other hand, it is enough to vary only the cut-out position of picture, and therefore the background picture can be synthesized in a simple processing as compared with computer graphics of synthesizing the background picture from complicated three-dimensional shape.

BRIEF DESCRIPTION OF THE DRAWINGS

FIG. 10 is a processing flow chart of the fourth embodiment of the invention;

FIG. 11 is a diagram showing a prior art; and

DESCRIPTION OF THE PREFERRED EMBODIMENTS

Embodiment 1

Figure 1:
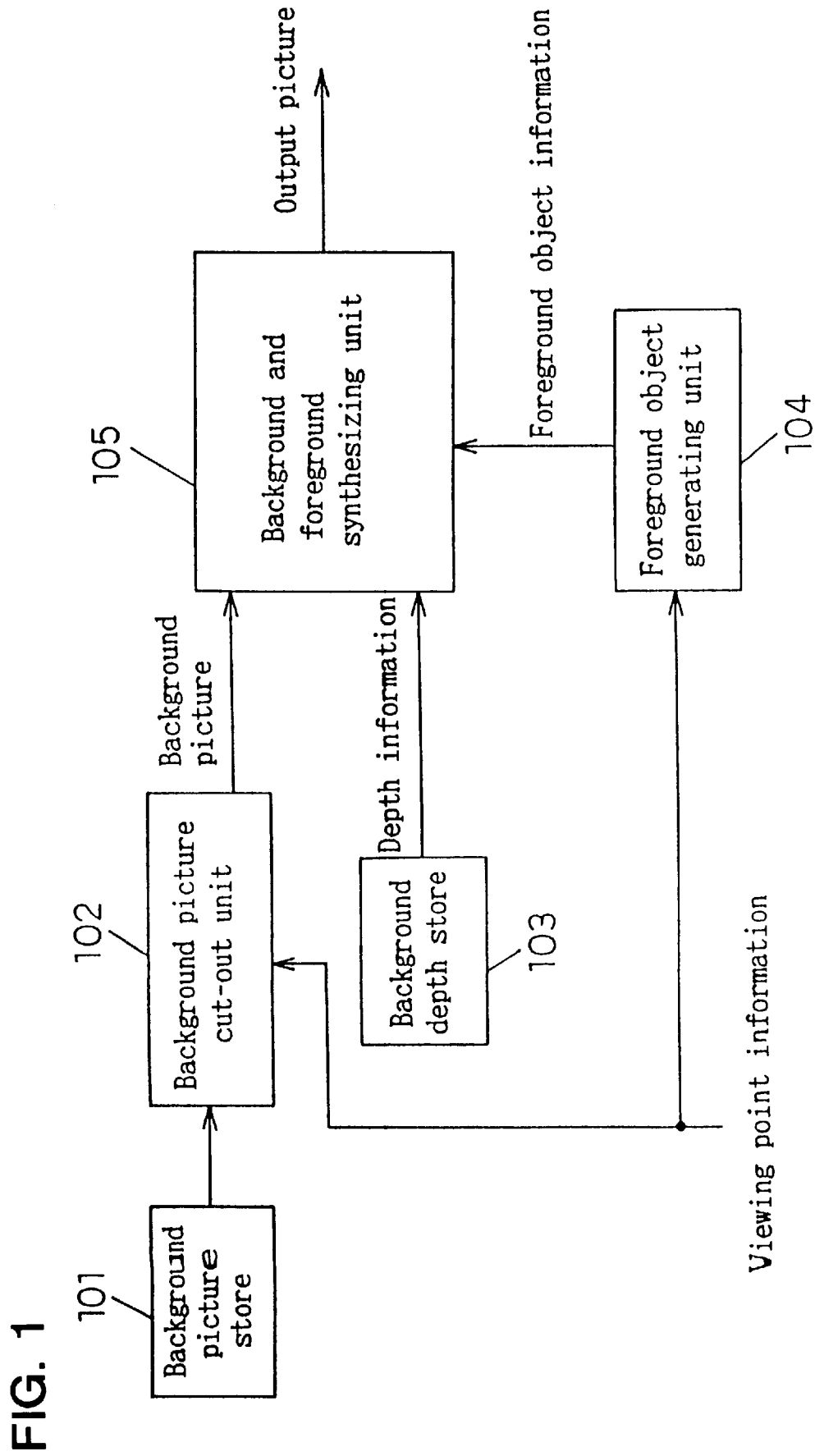
FIG. 1 is a schematic structural diagram of a first embodiment of the invention.

FIG. 1 is a schematic structural diagram of a picture synthesizing apparatus in a first embodiment of the invention. In FIG. 1, reference numeral 101 is a background picture store for storing a background picture in a wide range, 102 is a background picture cut-out unit for cutting out a background picture entering a viewing field by the viewing point information of viewing point direction, position and angle of field of view from the background picture in a wide range, 103 is a background depth store for storing the depth information of the background in a wide range corresponding to the background picture stored in 101, 104 is a foreground object generating unit for generating the foreground object information as the information for synthesizing the object in the picture such as the shape and position of the foreground object placed in three-dimensional space together with viewing point information, and 105 is a picture synthesizing unit for synthesizing the picture of the foreground object on the background picture in consideration of the hiding relation of the background picture and foreground object picture from 102 by comparing the background depth information from 103 and position of foreground object from 104.

Figure 2A:
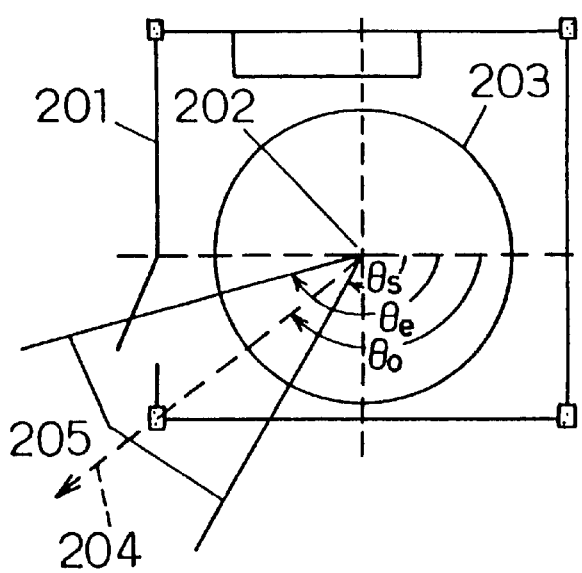
FIGS. 2(a)–(d) are diagrams showing the relation between background picture and background depth.

The operation of the first embodiment is described below. FIGS. 2(a)–(d) a rectangular background of a room or the like by a columnar panoramic picture, showing a case of synthesizing with a foreground object. FIG. 2a is a schematic diagram showing the relation between the panoramic picture and background from above the column. Reference numeral 201 is a plan view of a room, and its projection on a column 203 about the viewing point 202 is a panoramic picture 206 in FIG. 2b. It is a two-dimensional array defined by the angle of rotation θ about the viewing point and the height h in the vertical direction.

This panoramic picture 206 can be generated by a method of rotating the photo detector of vertical slit by 360 degrees or by splicing plane pictures. It is also possible to generate artificially by a technique of computer graphics, for example, a ray tracing method which takes a long processing time. Such picture is stored in the background picture store 101 in FIG. 1.

Figure 2C:
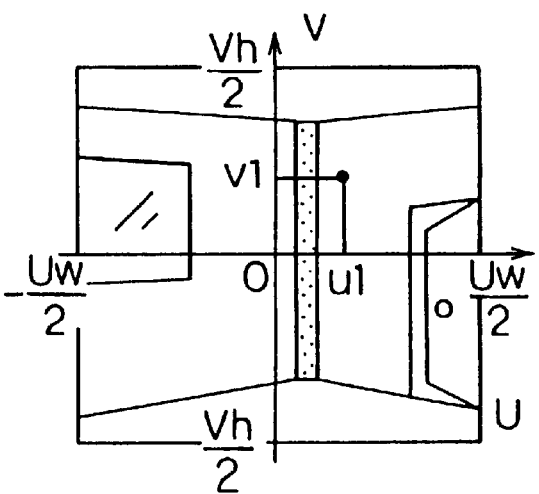
Figure 2B:
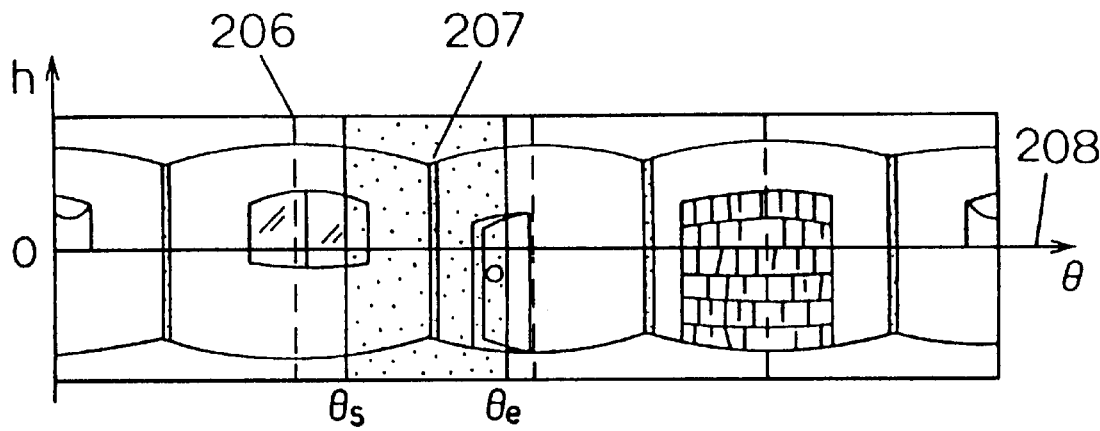

In the background picture cut-out unit 102, supposing now the viewing point to be at the position of 202 in FIG. 2a, the viewing line direction 204 to be θ0, and the viewing field to be somewhere between the angle value θs indicated by 205 and θe, the shaded area 207 on the panoramic picture 206 in FIG. 2b is the region corresponding to the background picture for cutting out the region 207.

For high speed cut-out, approximately, the distortion of the projection images of column and plane is ignored, and the output of the background picture cut-out unit 102 is obtained by primary linear interpolation from the region indicated by 207.

As shown in FIG. 2c, supposing the horizontal axis and vertical axis of the cut-out background picture to be U and V, respectively, and the width and height of the background picture to be Uw and Vh, the values of the point (u1, v1) in the picture are determined as the values of the point (θ1, h1) of the corresponding panoramic picture in the following formulas.

$$\theta 1 = u1/Uw \cdot (\theta e - \theta s) + \theta s$$
$$h1 = v1/Vw \cdot \text{Hmax} \quad [4]$$

where Hmax is the maximum value of h of the panoramic picture.

Since the panoramic picture is discretized, the point (θ1, h1) calculated in the formulas above may not be fitted accurately to the discretized point. In such a case, the value is calculated by linear approximation of four neighboring points.

More accurately, projections of column and plane are transformed. In this case, the point (θ1, h1) of the panoramic picture corresponding to the point (u1, v1) in the synthesized picture is determined in the following formulas, supposing the angle of field of view in the lateral direction to be , and the focal length to be F.

$$=(\theta e - \theta s)$$

$$F = 2 \cdot Uw/\tan(x/2)$$

$$\theta 1 = \arc \tan(u1/F) + \theta 0$$

$$h1 = v1 \cdot \cos(\theta 1) \qquad [5]$$

The depth information of the background is explained below. From a point at height h in the vertical direction from viewing point 202 in FIG. 2a, a straight line is extended in the direction of angle of rotation θ, and the distance until it hits against the background object 201 is supposed to be r (θ, h), and it is the background depth at (θ, h). The background depth information is a two-dimensional array of θ, h same as in the panoramic picture, and its element is the depth value r.

Figure 2D:
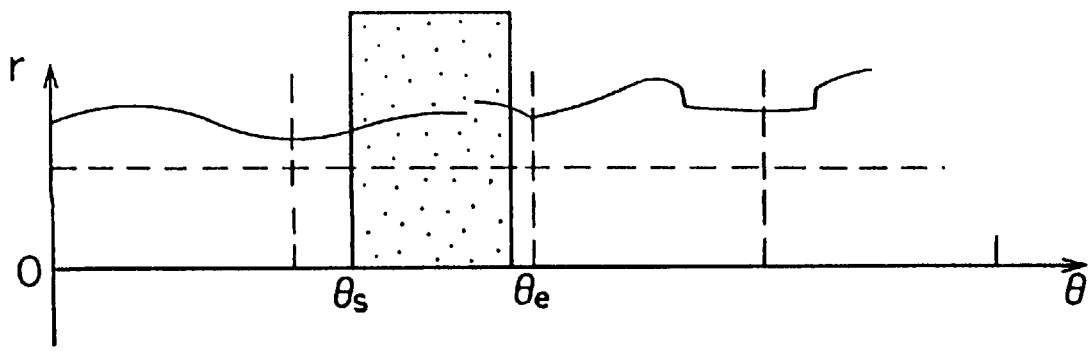

It is FIG. 2d which shows the change of the depth value r on the straight line where h in FIG. 2b is 0. The background depth information is generated by a three-dimensional measuring apparatus such as range finder, or generated by man by entering while referring to the background image with CAD tool or the like.

In the background depth cut-out unit, the depth value from θs to θe is cut out by the viewing point information. The depth value corresponding to point (u1, v1) in the picture is the value r (θ1, h1) corresponding to θ1, h1 calculated in formula 4 or formula 5.

Figure 3A:
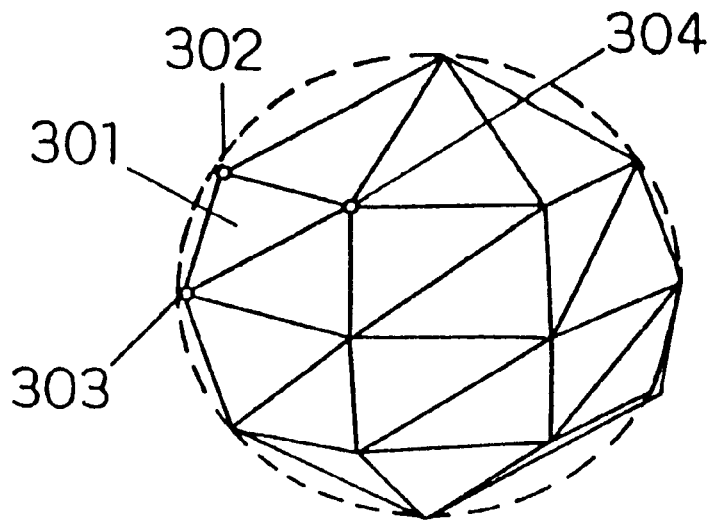
FIGS. 3(a)–(b) are diagrams showing the shape expression of a foreground object and the system of coordinates.
Figure 3B:
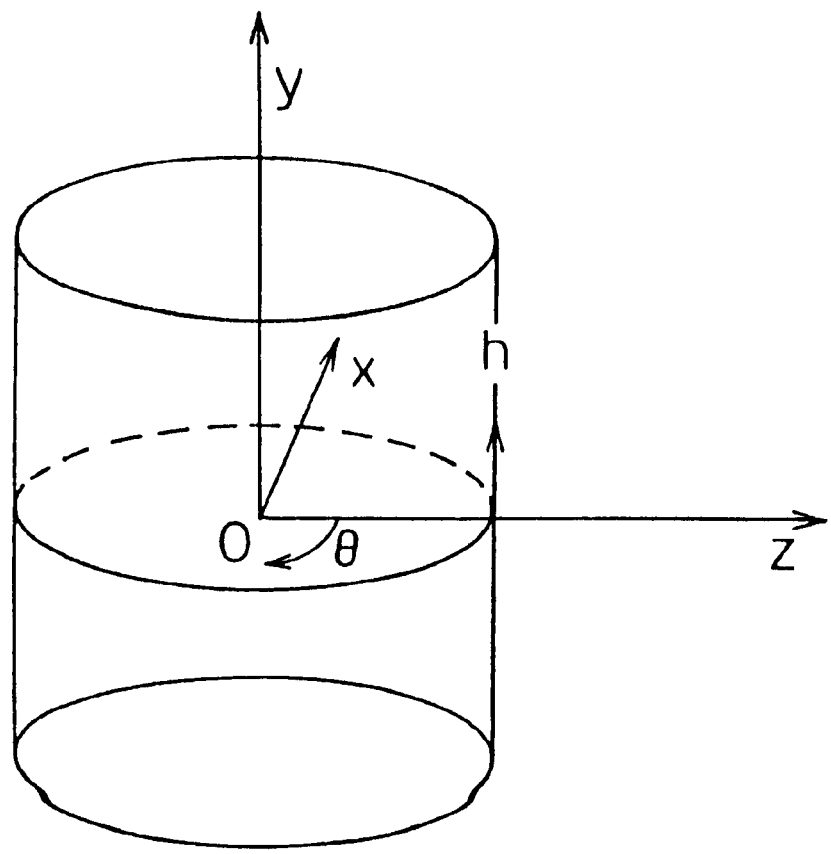

In the foreground object generating unit, the surface shape of the object to be generated is expressed by a polygon which is an approximation of a plane. FIG. 3a shows a sphere expressed by a triangular polygon. One polygon 301 is expressed by three elements, that is, a list of peaks for composing the polygon 301, three-dimensional coordinates of peaks 302, 303, 304 in the list, and polygon attribute information necessary for rendering such as polygon color and reflection coefficient. The three-dimensional position of the peak 304 is expressed by the system of rectangular coordinates of X, Y, Z. As shown in FIG. 3b, the origin is set at the same viewing point as the system of columnar coordinates of the panoramic picture, and the Z-axis is the axis with zero degree of horizontal rotational angle θ of panoramic picture. The Y-axis is an upward direction of the rotary axis of the cylinder, and X-axis is the system of right-hand coordinates orthogonal to the Z-axis and Y-axis. The three-dimensional positions of peaks, list of peaks for composing the polygon, and polygon attribute information about all polygons for composing the object is the foreground object information that is the output of the foreground object generating unit.

Incidentally, the foreground object is not limited only to the one having a three-dimensional magnitude. For example, in the case of using a two-dimensional picture of an object, when the picture is handled as attribute information pasted on the plane polygon, it may be handled similarly when the foreground is a two-dimensional picture.

Figure 4:
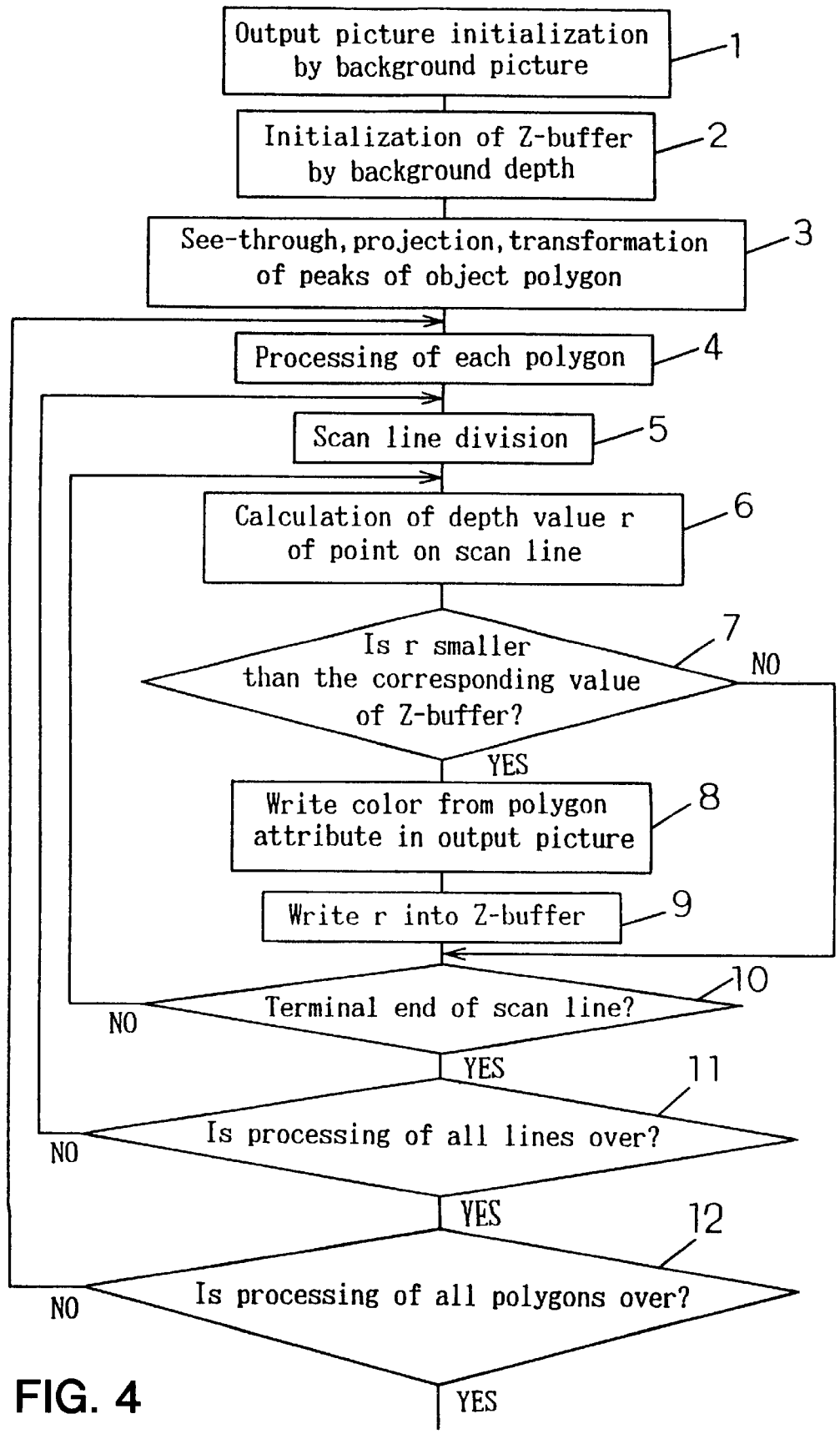
FIG. 4 is a processing flow chart of the first embodiment of the invention.

Next, in the background and foreground synthesizing unit, a method of synthesizing the foreground and background from the foreground object information, background information, and background depth information is described by referring to a drawing. FIG. 4 is a flow chart of background and foreground synthesization. For hidden surface processing, the Z-buffer method widely employed in computer graphics is used.

(1) First, the background picture of the output of the background picture cut-out unit is copied on the output picture. As a result, the value is defined in the entire output picture.

(2) In the Z-buffer of which each element is a two-dimensional array of the depth information in the same size as the output picture, the background depth information from the background depth information cut-out unit is copied. The larger the depth value, the more remote it is from the viewing point.

(3) The coordinates of each peak of the polygon for composing the object are seen through, projected and transformed. The coordinates of the peak are (x0, y0, z0). First, the direction θ0 of viewing point and Z-axis shown in FIG. 2a are rotated about the Y-axis in the following formula to coincide with the direction of the viewing line. Supposing the coordinates after transforming into the system of coordinates of the viewing point to be (xp, yp, zp), it follows that:

$$xp = x0 \cdot \cos \theta - z0 \sin \theta$$

$$yp = y0$$

$$zp = x0 \cdot \sin \theta + z0 \cdot \cos \theta \qquad [6]$$

Next, in the system of UV coordinates as shown in FIG. 2c, the projection is transformed onto the output picture of the width Uw, height Vh. The point (u0, v0) on the picture on which the peak is projected is determined in the following formula by using F in formula 5. Herein, the aspect ratio of the projection and transformation is supposed to be 1.

$$u0 = F \cdot xp/zp$$

$$v0 = F \cdot yp/zp \qquad [7]$$

(4) Polygons of the foreground object from the foreground object generating unit are sequentially processed.

(5) The polygon is divided into scan lines, and each pixel on each scan line is processed. The polygon is divided into scan lines parallel to the U-axis on the output image, and the coordinates in the system of coordinates of viewing field at both end points of each scan line are calculated, and the coordinates (xp1, yp1, zp1) in the system of coordinates of viewing field of internal point (u1,v1) on the scan line are calculated by internal division of both end points.

(6) The depth value r of the columnar system of coordinates of the point (u1, v1) on the scan line is calculated in the following formula.

$$r = sqrt(xp \cdot xp + zp \cdot zp) \qquad [8]$$

where sqrt ( ) denotes the square root.

(7) The depth value corresponding to (u1, v1) of the Z-buffer is compared with r. When r is smaller, the point of the foreground object is before the background, and steps (8) and (9) are processed. When larger, it remains as background picture. Hence, the foreground object hidden in the background is not displayed, and the partially concealed foreground object can be also expressed.

(8) The color of the plane determined from the polygon attribute information is written into the point (u1, v1) of the output image.

(9) The depth value r calculated in (7) is written into the point (u1, v1) of the Z-buffer.

(10) All pixels on the scan line are processed according to steps (6) to (9).

(11) All scan lines of polygon are processed according to steps (5) to (10).

(12) All polygons of an object are processed according to steps (4) to (11).

Embodiment 2

Figure 5:
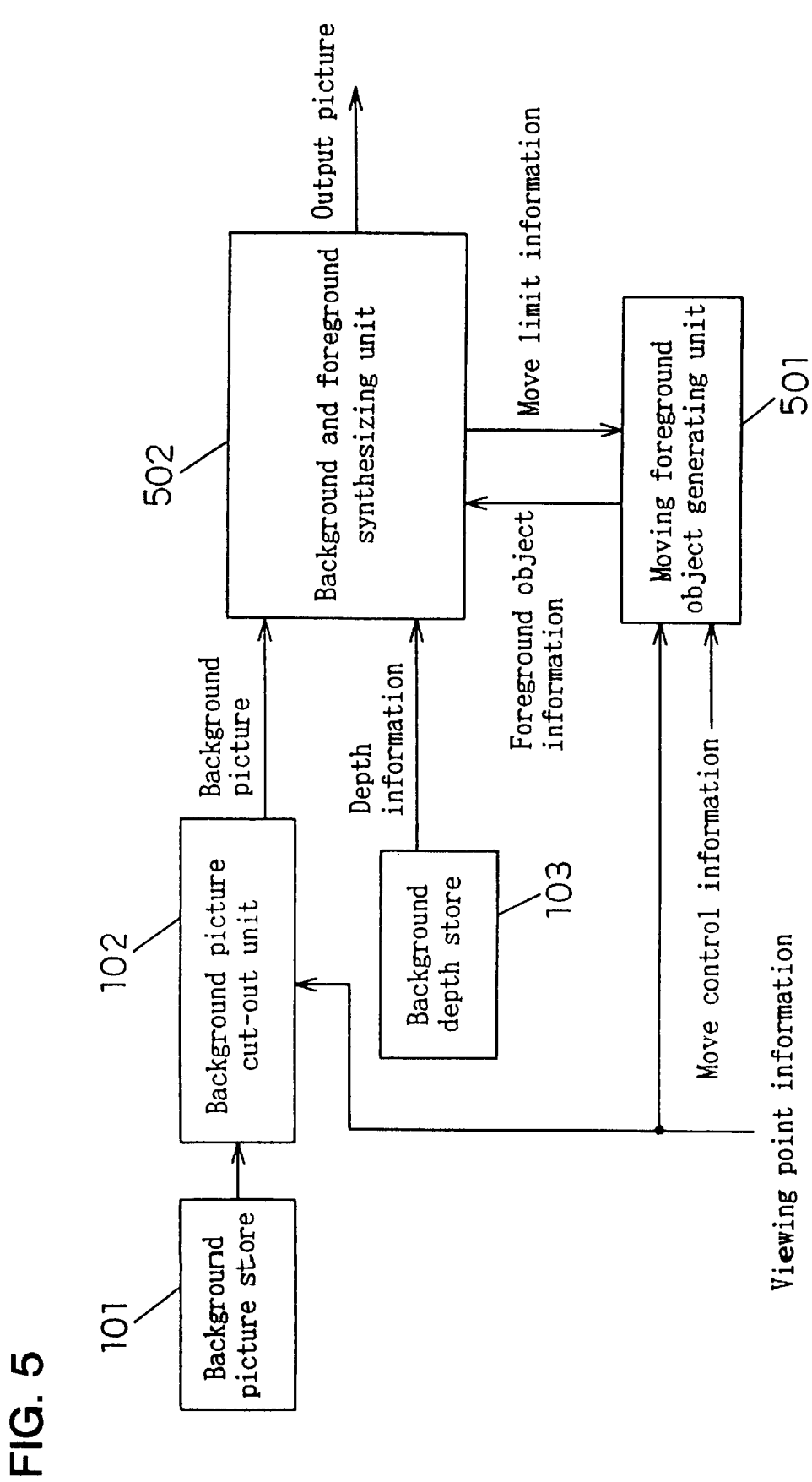
FIG. 5 is a schematic structural diagram of a second embodiment of the invention.

A second embodiment of the invention is described below. FIG. 5 is a schematic structural diagram of the second embodiment. Reference numeral 501 is a moving foreground object generating unit for generating a moving object which moves in a three-dimensional space according to moving control information. The moving control information is either interactively instructed by man by means of mouse or the like, or internally calculated to generate a trajectory. As a former example, an object simulating the hand of a man is moved in a room, and as a latter example, a ball bounces in a room. In this case, once the initial motion direction is determined, the subsequent trajectory until hitting against the wall can be calculated dynamically. In this moving foreground object generating unit 501, together with the three-dimensional shape of the object explained in the first embodiment, the information of its moving direction and speed are also stored.

Figure 6:
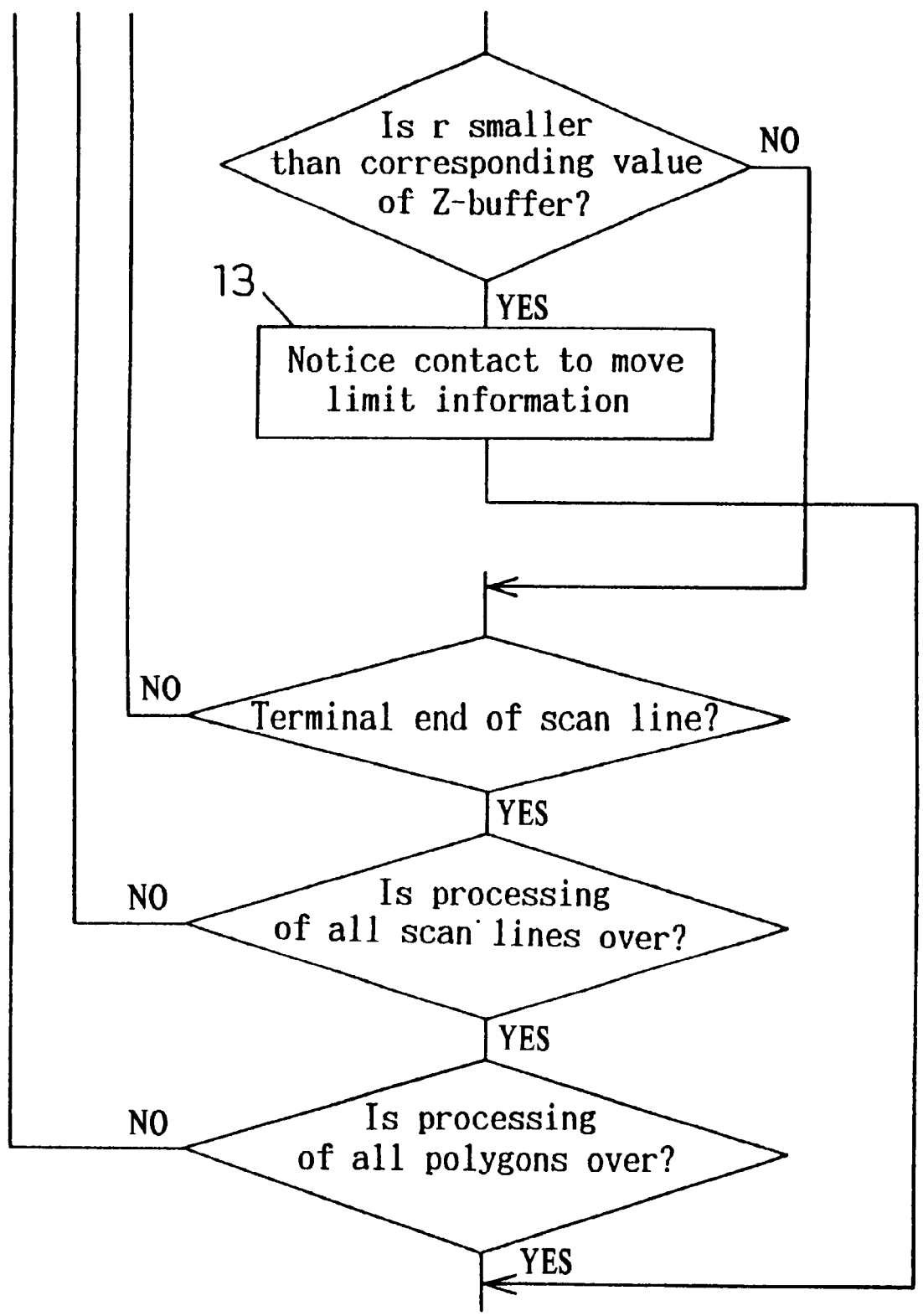
FIG. 6 is a processing flow chart of the second embodiment of the invention.

In a background and foreground synthesizing unit 502, steps (8) and (9) of the Z-buffer processing explained in FIG. 4 in the first embodiment is changed to contact judging process as shown in FIG. 6.

(13) Contacting of the background and moving foreground object is noticed to the moving foreground object generating unit 501 as moving limit information.

Afterwards, suspending the synthesizing process, picture synthesizing is started again with new foreground object information from the moving foreground object.

When this moving limit information is entered, in the moving foreground object generating unit 501, the presently held moving direction is inverted, and the information of the changed moving foreground object is generated at the position moved by the portion of the speed.

Hence, when attempted to synthesize a picture of moving an object behind the background, the motion of reflection such as bouncing against the wall is reproduced, without being buried in the wall or the like.

At step (13), without stopping the synthesization instantly, by adding the number of the contacting polygon and the point coordinates to the moving limit information and then transferring to the next polygon processing, it is known how many polygons have made contact in the moving foreground object generating unit 501. By deforming the contacting polygons according to this information, shapes not only reflecting merely but crushed by contact can be also synthesized.

Moreover, by providing the foreground object information with changeover information of reflection process or penetration process in every polygon, reflection processing and hidden surface processing can be changed over, so that a bouncing object and a wall penetrating object can be synthesized simultaneously.

By producing the output of synthesized picture after completion of all processes, flickering of output image due to retry of synthesization or the like can be prevented.

Embodiment 3

Figure 7:
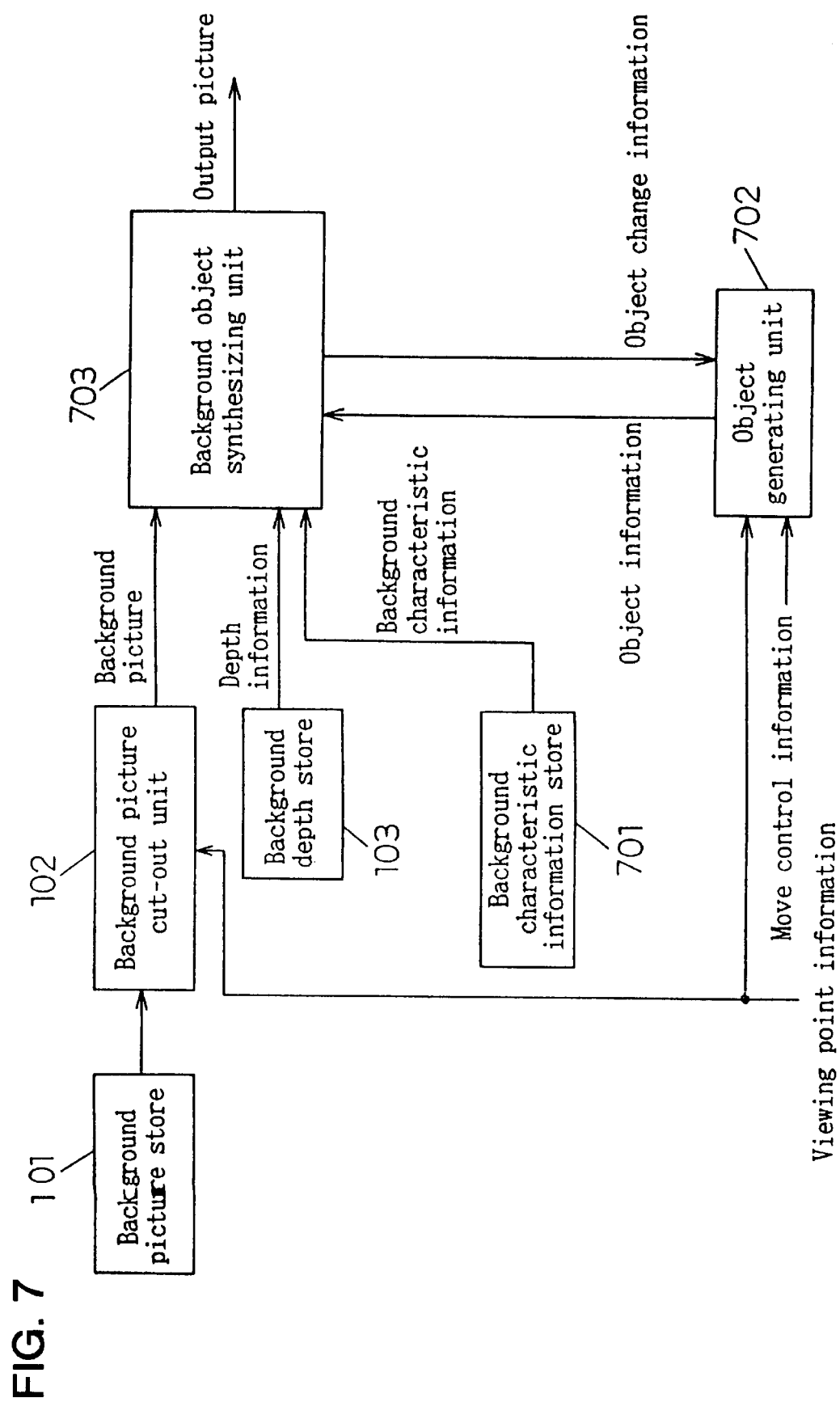
FIG. 7 is a schematic structural diagram of a third embodiment of the invention.

A third embodiment of the invention is described below. FIG. 7 is a schematic structural diagram of the third embodiment of the invention. Reference numeral 701 is a background characteristic store, which stores background characteristics, such as the inclination of the background surface, attracting and bouncing repulsive coefficients of the background and object, impact factor to determine the impact strength of collision due to hardness of the background material, and temperature of background material, as the information for determining the characteristics in the case of mutual action of the background and object by collision or the like, corresponding to the background picture of the background picture store 101.

The background characteristic information is a two-dimensional array of rotational angle θ around the horizontal axis and height h in the vertical direction same as in the background picture, and each element of the array consists of a corresponding background characteristic.

For example, considering the inclination and repulsive coefficient as the background characteristics, the inclination of the background surface can be expressed by normal vectors (Nx, Ny, Nz). The system of coordinates of the normal vectors is the system of XYZ rectangular coordinates same as the system of coordinates of peaks of an object.

Supposing the repulsive coefficient of background to be v1, it refers to the ratio of speed of an object before and after collision, and when it is 1, the speed is not lowered, and when smaller than 1, it decelerates. For example, when v1 is 0, the surface has a nature of attraction, and the object sticks to the background. Usually the value is somewhere between 0 and 1, but it may exceed 1 in the case of repulsion by magnetic force or the like.

By collision, moreover, in an object generating unit 702, three-dimensional moving direction vectors (Mx, My, Mz) of object are added to the shape and position of the object, and the object information such as repulsive coefficient v2 of object same as the background characteristic is entered, if necessary, into a background object synthesizing unit 703.

In the background object synthesizing unit 703, same as in the second embodiment, contact between background and object is investigated.

In FIG. 6 (13) refers to the case of occurrence of contact, in which from the direction vector of the moving object and the normal vector of the background, reflection direction vectors (Lx, Ly, Lz) are determined as follows so as to be symmetrical to the normal of the background inclination and moving direction.

$Lx = Mx - Nx$ $Ly = My - Ny$ $Lz = Mz - Nz$ [9]

Moreover, from the moving speed of the object before reflection, repulsive coefficient v1 of background and repulsive coefficient v2 of object, the moving speed of the object after reflection is calculated. For example, supposing the speed before reflection to be V1 and the speed after reflection to be V2, it can be calculated as $V2 = v1 \times v2 \times V1$ [10]

The direction and moving speed after reflection of the object are added to the object change information. In the object generating unit 702, the averages of direction and speed of this reflection are determined in the entire object, and utilized as the direction and speed of the next moving quantity. Or, in the object change information, the point of the maximum difference between the background depth value and the object point depth value r is set as the first contact point, and the moving direction and speed of that point are set as the new moving direction and speed, thereby generating an object.

By adding the impact coefficient of the background at the point of collision against the object to the object change information, in the object generating unit 702, when the impact coefficient exceeds the impact deformation threshold stored as the characteristic of object, by generating an object by adding deformation processing such as reduction of the object shape in the moving direction depending on the impact coefficient, it is possible to express a picture when a soft object collides against a hard background.

Or, by adding the background temperature to the object change information, in the object generating unit 702, it is possible to synthesize a picture of change of the object due to background temperature by generating an exploded, evaporated or fused object in the case over a specific temperature, depending on the characteristic about the temperature of object.

A method of calculating the inclination of background from the background depth information in the above case is described. Direction vectors are calculated in a three-dimensional space from a point desired to determine the inclination to a neighboring point. The three-dimensional position of a point on the background is expressed by the columnar system of three coordinates, that is, θ and h of panoramic picture and depth value r. It is transformed into a system of rectangular coordinates explained in FIG. 3b, and the vectors are calculated by subtracting the central coordinate values from the coordinates of the neighboring point, thereby normalizing so that the magnitude may be 1. When concerning with four vicinities of upper, lower, right and left positions, four vectors are obtained. An outer product of two adjacent vectors of these vectors is calculated. In the case of four vicinities, four outer product vectors are obtained. Averaging these four outer product vectors and normalizing to magnitude 1, the background inclination of the point to be determined is obtained.

Embodiment 4

Figure 8:
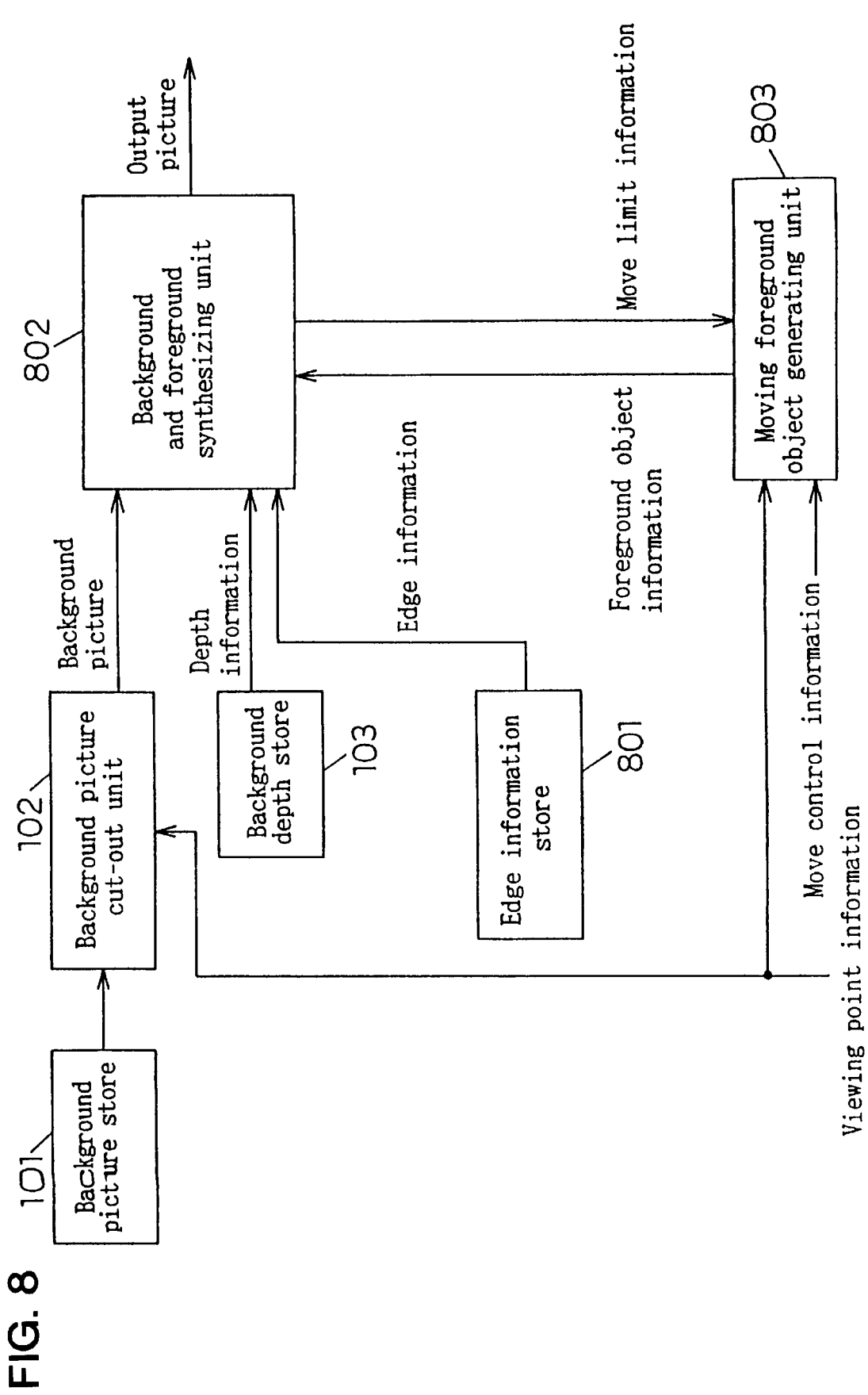
FIG. 8 is a schematic structural diagram of a fourth embodiment of the invention.

A fourth embodiment of the invention is described below. FIG. 8 shows a schematic structural diagram of the fourth embodiment. Reference numeral 801 in FIG. 8 is an edge information store, which stores the edge information telling whether there is a discontinuous point or not in the depth of the background, and whether or not possible to pass through the discontinuous edge if any.

The edge information is a two-dimensional array of θ and h, and each element has a value of 0 if there is no edge, 1 if possible to pass through an edge, and 2 if impossible.

In the case of the edge, moreover, it has maximum and minimum values of the edge depth. In the absence of edge, the values are indefinite.

Figure 9A:
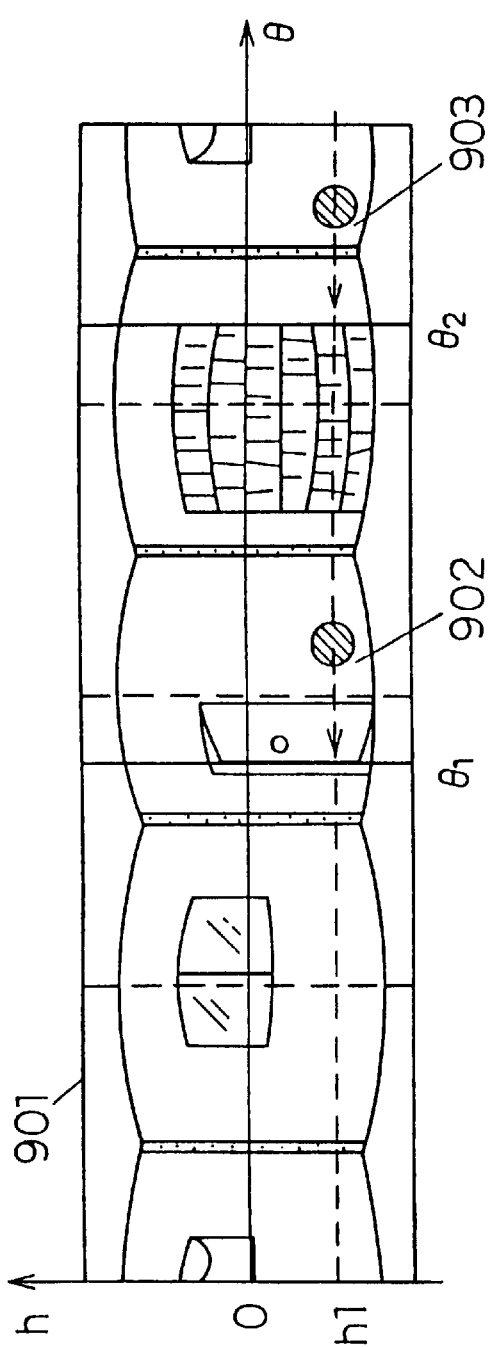
FIGS. 9(a)–(b) are diagrams showing depth edge information.
Figure 9B:
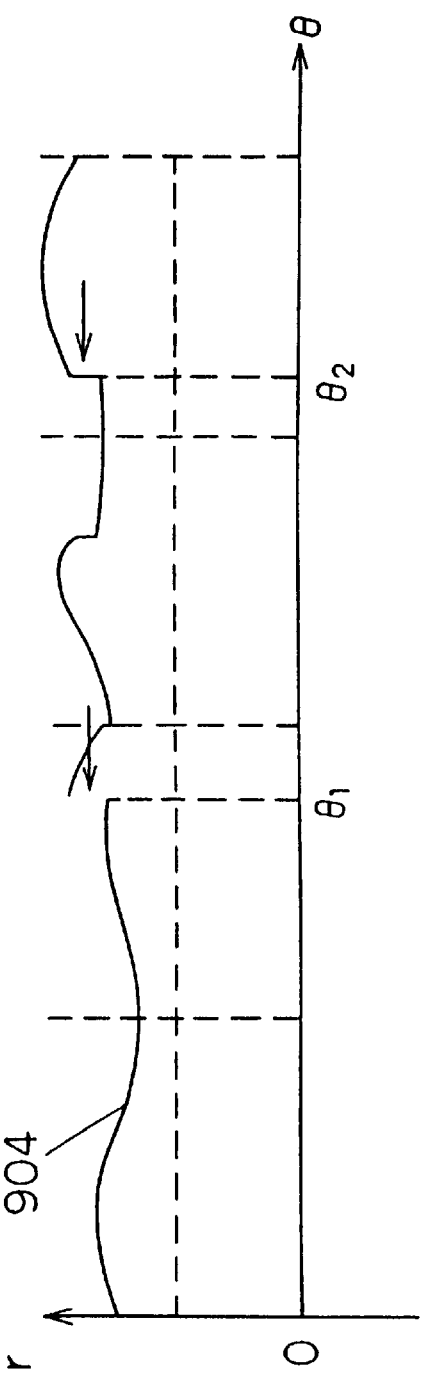
Figure 12A:
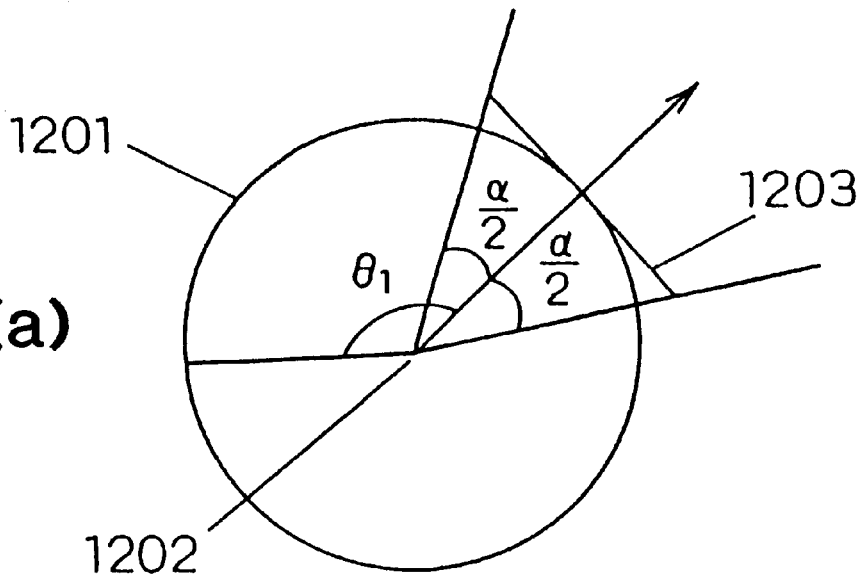
FIGS. 12(a)–(c) are diagrams showing other prior art.
Figure 12B:
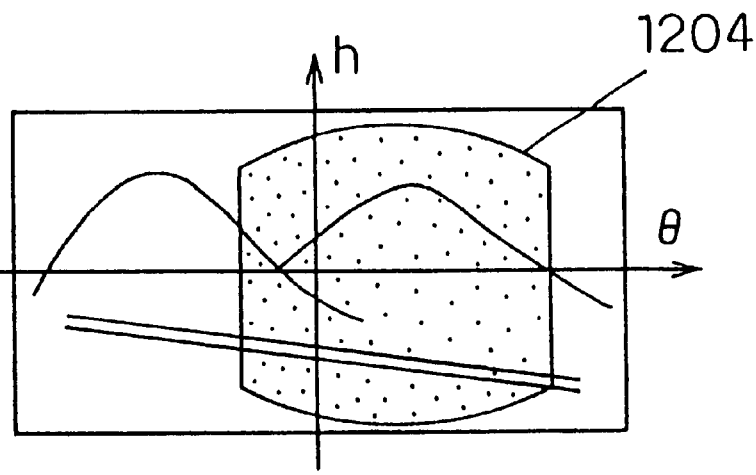
Figure 12C:
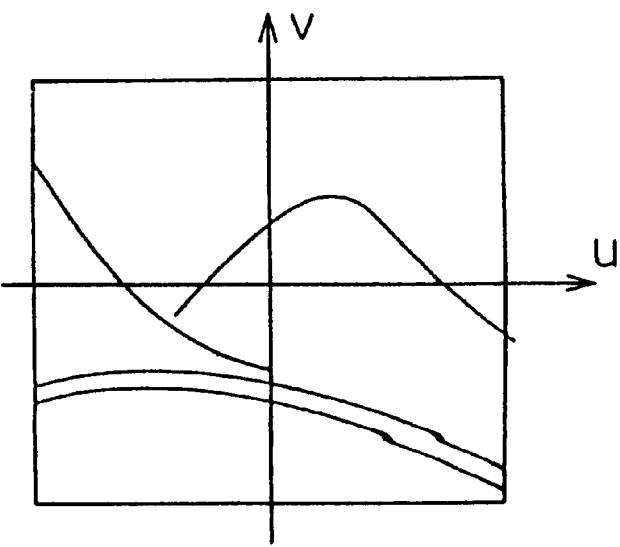

The edge information is specifically described by referring to the diagrams. In FIG. 9a, reference numeral 901 is a background picture, 902 denotes an object moving to position (θ1, h1) and its moving direction, and 903 indicates an object at position (θ2, h1) and its moving direction. Suppose the shape of the depth r at height h1 to be 904 as shown in FIG. 9b. At θ1, there is a discontinuous edge in the depth due to door, and at θ2, there is a discontinuous edge in the bookshelf. It is possible to pass through at θ1, and impossible at θ2.

Accordingly, in the edge information, (θ1, h1) is the value of 1, and (θ2, h1) is 2, and maximum value and minimum value of each edge are stored.

In the moving foreground object generating unit 803, the shape, position and moving direction of the moving object are entered in a background and foreground synthesizing unit 802 on the basis of the moving control information. In the background and foreground synthesizing unit 802, contact of the background and foreground moving object is judged. FIG. 10 is a flow chart of this contact judgment.

(1) Referring to the flag at the corresponding point of edge information, process is branched.

(2) If the flag is 0, it is not an edge point, and contact is judged same as in the second embodiment, and in the case of contact, the contact is noticed to the moving foreground object generating unit 803 by the moving control information.

(3) If the flag is 1, it is the edge that can be passed through. Same as in the first embodiment, hidden surface processing is done by the Z-buffer.

(4) If the flag is 2, there is an edge that cannot be passed through in the depth direction. In this case, when there is an object between the maximum and minimum of the edge, the moving control information is noticed to the moving foreground object generating unit 803 so as to the reflect the moving direction to the opposite side of the depth direction.

Depending on such processing, in the moving foreground object generating unit, the moving direction is corrected when necessary, and the moving object is generated.

In the foregoing embodiments, panoramic pictures are used, but the background picture of the invention is not limited to panoramic picture alone. For example, it can be easily applied to plane pictures explained in the prior art by replacing the system of columnar coordinates with a system of rectangular coordinates. Or, instead of a column, a background picture projected on a sphere may be also used. In such a case, the system of columnar coordinates is replaced with a system of polar coordinates.

Effects of the Invention

Thus, according to the invention, by hidden surface processing and processing reflection by plane, which are three-dimensional mutual actions of the foreground object and background, together with synthesization of background by rotation of viewing point, it is possible to synthesize the picture with an enhanced presence as a three-dimensional space.

It is understood that various other modifications will be apparent to one skilled in the art without departing from the spirit and scope of this invention. Accordingly, it is not intended that the scope of the claims appended hereto be limited to the description as set forth herein, but rather that the claims be construed as encompassing all the features of patentable novelty that reside in the present invention.

What is claimed is:

1. A picture synthesizing apparatus comprising:

background image storing means for storing a background image obtained by viewing said background from a predetermined view point in 3-dimensional space.

background depth storing means for storing depth information about each pixel in said background image, said depth information including a distance between said view point and a background element in said background image, each respective element corresponding to each respective background pixel, foreground object input means for entering information about a foreground object placed in said 3-dimensional space, and obtaining a foreground image as viewed from said view point, foreground object depth calculation means for calculating depth information about each pixel of said foreground image, said depth information including a distance between said viewpoint and a foreground element in said foreground image, each respective element corresponding to each respective foreground pixel, judging means for determining if contact has occurred between the foreground element and the background element, changing means for changing the foreground image when the judging means determines that contact has occurred and synthesizing means for synthesizing a final image by selecting either a background pixel or a foreground pixel, said two pixels being in a same direction line from said viewpoint, wherein said judging means for determining if contact has occurred is based on a property of the background element and a property of the foreground element, and wherein said information about the foreground object includes velocity of the foreground object, and the property of the foreground element includes a repulsive coefficient, a temperature and an elasticity of the foreground object, and the property of the background element includes a repulsive coefficient, a temperature and a hardness of the background element.

2. A picture synthesizing apparatus according to claim 1 wherein said changing means includes configuration changing characteristics of explosion and fusion, based on the temperature of the foreground object and the temperature of the background element.

3. A picture synthesizing apparatus according to claim 1 wherein said changing means includes configuration changing characteristics of deformation and scattering, based on the hardness of the background element and the elasticity of the foreground element.

4. A picture synthesizing apparatus according to claim 1 wherein (a) inclination of each background element is represented by normal vectors (Nx, Ny, Nz), the repulsive coefficient of each background element is represented by v1, moving speed of the foreground object is represented by V1, moving direction of the foreground object is represented by (Lx, Ly, Lz), new moving speed of the foreground object after the contact is represented by V2, and new moving direction of the foreground object after the contact is represented by (Mx, My, Mz), (b) the new moving speed V2, and the new moving direction (Mx, My, Mz) is calculated on the basis of the inclination (Nx, Ny, Nz), repulsive coefficient v1, moving speed V1, and moving direction (Lx, Ly, Lz), and (c) a new position of the foreground object is obtained on the basis of the new moving speed V2, and new moving direction (Mx, My, Mz).

5. A picture synthesizing apparatus comprising:

background image storing means for storing a background image which is obtained by looking a certain background from a predetermined view point within 3 dimensional space, background depth storing means for storing depth informations about each respective pixel of said background image, while said depth information is a distance between the view point and a constitution element of said certain background, the each respective element being corresponding to said each respective pixel, foreground object information input means for entering object information of at least position and configuration of a foreground object placed in said 3 dimensional space, thereby to obtain a foreground image by looking the foreground object from the view point, foreground object depth calculation means for calculating foreground object depth informations which are distances between said view point and each respective constitution element of said foreground object within said 3 dimensional space, by using said object information, synthesizing means for synthesizing a total image by selecting either a pixel (A) of the background image or a pixel (B) of the foreground object image on the basis of the background depth informations and the foreground depth informations, while the two pixels (A), (B) to be selected are such pixels that a constitution element of the background corresponding to the pixel (A) of the background image and a constitution element of the foreground object corresponding to the pixel (B) of the foreground image are on a same direction line from said view point.

6. A picture synthesizing apparatus according to claim 5, wherein the synthesizing means selects a pixel which has a smaller value of said depth information.

7. A picture synthesizing apparatus according the claim 5, wherein thebackground depth information includes an information about a discontinuous point of the background.

8. A picture synthesizing apparatus according to claim 5, comprising further wide background image storing means for storing a wide background image, and background image cut out means for cutting out a narrow background image which is within a certain view field which is determined by an inputted view point information, from the wide background image, wherein said background image storing means stores the cut out narrow background image.

9. A picture snythesizing apparatus comprising:

background image storing means for storing a background image which is obtained by looking a certain background from a predetermined view point within 3 dimensional space, background depth storing means for storing depth informations about each respective pixel of said background image, while said depth information is a distance between the view point and a constitution element of said certain background, the each respective element being corresponding to said each respective pixel, foreground object information input means for entering object information of at least position and configuration of a foreground object placed in said 3 dimensional space, thereby to obtain a foreground image by looking the foreground object from the view point, foreground object depth calculation means for calculating foreground object depth informations which are distances between said view point and each respective constitution element of said foreground object within said 3 dimensional space, by using said object information, judging means for judging a contact of an element (C) of said foreground object with an element (D) of said background, on the basis of the background depth informations and the foreground depth informations, while said element (C) of the foreground object and said element (D) of the background are on a same direction line from said view point, changing means for changing the configuration or position of said foreground object on a basis of a predetermined rule when the judging means judges that the contact occurs, synthesizing means for synthesizing a total image by selecting either a pixel (A) of the background image or a pixel (B) of a foreground object image which is an image obtained from the changed foreground object, on the basis of the background depth informations and foreground depth informations which are depth information for the changed foreground object, while the two pixels (A), (B) to be selected are such pixels that a constitution element of the background corresponding to the pixel (A) of the background image and a constitution element of the changed foreground object corresponding to the pixel (B) of the changed foreground image are on a same direction line from said view point.

10. A picture synthesizing apparatus according to claim 9, wherein
the rule is such that the change is determined on the property of the background and the property of the foreground object.

11. A picture synthesizing apparatus according to claim 10, wherein
said foreground object information includes a velocity of the foreground object,
the property of the background includes repulsive coefficient, temperature, or hardness,
the property of the foreground object includes repulsive coefficient, elasticity, or temperature.

12. A picture synthesizing apparatus according to claim 11, wherein
the property of temperature of the foreground object is configuration changing characteristics such as explosion or fusion on the basis of the temperature of the background.

13. A picture synthesizing apparatus according to claim 12, wherein
the elasticity property of the foreground object is configuration changing such as deformation or disassembly corresponding to the hardness of the background.

14. A picture synthesizing apparatus according to claim 12, wherein
when inclination of each element of the background is represented with normal vectors (Nx, Ny, Nz), repulsive coefficient of the background is represented with v1, moving speed of the foreground object is represented with V1, moving direction of the foreground object is represented with (Lx, Ly, Lx), new moving speed of the foreground object after the contact is represented with V2, and new moving direction of the foreground object after the contact is represented with (Mx, My, Mz),
the new moving speed V2, and new moving direction (Mx, My, Mz) is calculated on the basis of the inclination (Nx, Ny, Nz), repulsive coefficient v1, moving speed V1, and moving direction (Lx, Ly, Lz),
a new position of the foreground object is obtained on the basis of the new moving speed V2, and new moving direction (Mx, My, Mz).

15. A method for synthesizing a picture comprising the steps of:
(a) storing a background image obtained by viewing a background from a predetermined view point within a 3 dimensional space,
(b) storing depth information about each respective pixel of the background image, wherein the depth information includes distance between the view point and an element of the background, each respective element corresponding to each respective pixel,
(c) entering object information of at least position and configuration of a foreground object placed in the 3 dimensional space, thereby to obtain a foreground image by viewing the foreground object from the view point,
(d) calculating foreground object depth including distances between the view point and each respective element of the foreground object within the 3 dimensional space, by using the object information,
(e) synthesizing a total image by selecting either a pixel (A) of the background image or a pixel (B) of the foreground object image based on the background depth information and the foreground depth information, when the two pixels (A), (B) to be selected are in a direction line from the view point.

16. The method of claim 15 wherein the step of synthesizing includes selecting a pixel which has a smaller depth value.

17. The method of claim 15, wherein
the background depth information includes information about a discontinuous point of the background.

18. The method of claim 15, including the following steps:
(f) storing a wide background image,
(g) cutting out a narrow background image from the wide background image, and
(h) storing the cut out narrow background image as the background image in step (a).

19. A method for synthesizing a picture comprising the steps of:
(a) storing a background image obtained by viewing a background from a predetermined view point within a 3 dimensional space,
(b) storing depth information about each respective pixel of the background image, wherein the depth information includes distance between the view point and an element of the background, each respective element corresponding to each respective pixel
(c) entering object information of at least position and configuration of a foreground object placed in the 3 dimensional space, thereby to obtain a foreground image by viewing the foreground object from the view point,
(d) calculating foreground object depth including distances between the view point and each respective element of the foreground object within the 3 dimensional space, by using the object information,
(e) judging contact of an element (C) in the foreground object with an element (D) in the background, on the basis of the background depth and the foreground depth when element (C) and element (D) are in a direction line from the view point,
(f) changing the configuration or the position of the foreground object based on a predetermined rule after judging that contact has occurred, and (g) synthesizing a total image by selecting either a pixel (A) of the background image or a pixel (B) of a foreground object image based on the background depth information and foreground depth information when the two pixels (A), (B) to be selected are in a direction line from the view point.

20. The method of claim 19, wherein the predetermined rule is based on a property of the background and a property of the foreground object.

21. The method of claim 20, wherein the foreground object information includes velocity of the foreground object, the property of the background includes one of repulsive coefficient, temperature and hardness, and the property of the foreground object includes one of repulsive coefficient, elasticity and temperature.

22. The method of claim 21, wherein the property of temperature of the foreground object is a configuration changing characteristic such as explosion or fusion and is based on temperature of the background.

23. The method of claim 22, wherein the elasticity property of the foreground object is a configuration changing characteristic, such as deformation or disassembly corresponding to hardness of the background.

24. The method of claim 22, wherein when inclination of each element of the background is represented with normal vectors (Nx, Ny, Nz), repulsive coefficient of the background is represented with v1, moving speed of the foreground object is represented with V1, moving direction of the foreground object is represented with (Lx, Ly, Lz), new moving speed of the foreground object after the contact is represented with V2, and new moving direction of the foreground object after the contact is represented with (Mx, My, Mz), the new moving speed V2, and new moving direction (Mx, My, Mz) is calculated on the basis of the inclination (Nx, Ny, Nz), repulsive coefficient v1, moving speed V1, and moving direction (Lx, Ly, Lz), and a new position of the foreground object is obtained on the basis of the new moving speed V2, and new moving direction (Mx, My, Mz).

* * * * *